United States Patent [19]

Steilen et al.

[11] Patent Number: 4,609,203
[45] Date of Patent: Sep. 2, 1986

[54] HITCH STRUCTURE WITH VARIABLE LINK

[75] Inventors: Ronald M. Steilen, Ankeny; John R. Myers, Polk City; Vernon E. Rettig, Bondurant, all of Iowa

[73] Assignee: Deere & Company, Moline, Ill.

[21] Appl. No.: 771,314

[22] Filed: Aug. 30, 1985

[51] Int. Cl.⁴ .................. A01B 59/043; B60D 1/04
[52] U.S. Cl. ................. 280/461 A; 280/446 A; 280/460 A; 280/474; 280/415 R
[58] Field of Search ............ 280/411 A, 412, 413, 280/415 A, 415 R, 446 A, 474, 476 A, 456 A, 460 A, 461 A; 174/449

[56] References Cited

U.S. PATENT DOCUMENTS

| 3,140,103 | 7/1964 | Virtue et al. | 280/474 |
| 3,380,759 | 4/1968 | Engelmann | 280/474 |
| 3,561,789 | 2/1971 | Strikeleather | 280/461 A |
| 4,232,878 | 11/1980 | Moore, Jr. | 280/461 A |
| 4,518,046 | 5/1985 | Rettig et al. | 280/411 A |

*Primary Examiner*—John J. Love
*Assistant Examiner*—Donn McGiehan

[57] ABSTRACT

Three-point hitch structure for connecting an implement to a towing vehicle wherein the upper link is made variable by means of a hydraulic cylinder pinned to a plate to provide three pivot points. When the cylinder is retracted, the two components act as a fixed length link, with the middle pivot point maintained slightly off center with respect to the two outer pivot points by a stop member. When the cylinder is extended, the middle pivot moves away from the centerline joining the two outer pivot points to allow the overall length to either lengthen or shorten. The towed vehicle is therefore free to rock with respect to the hitch and includes gauge and stabilizing wheels to maintain the implement in proper relationship with the ground contour. The link cylinder is plumbed into the hitch lift circuit so that when the implement is raised to transport position, the upper link automatically becomes fixed length and when the implement is lowered to operating position, the link automatically returns to a variable length configuration.

19 Claims, 6 Drawing Figures

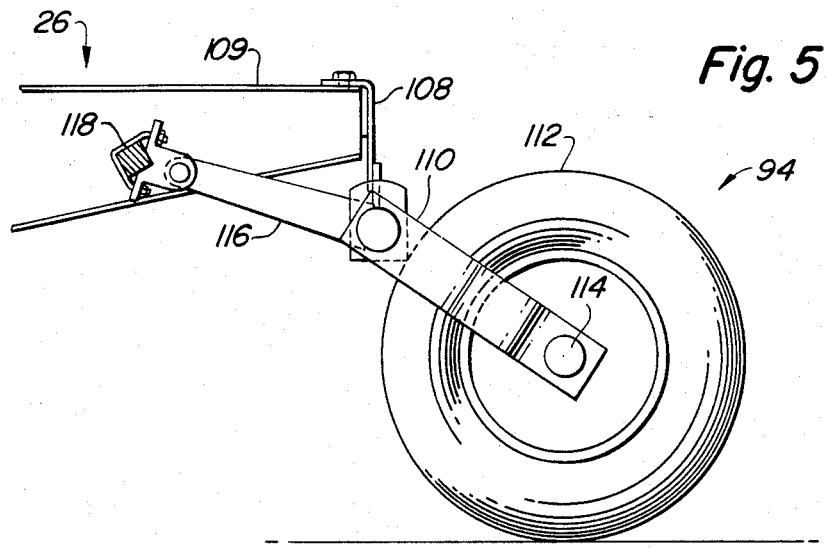
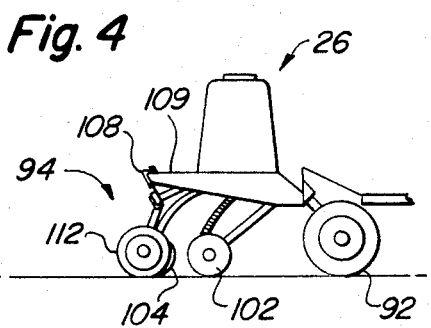
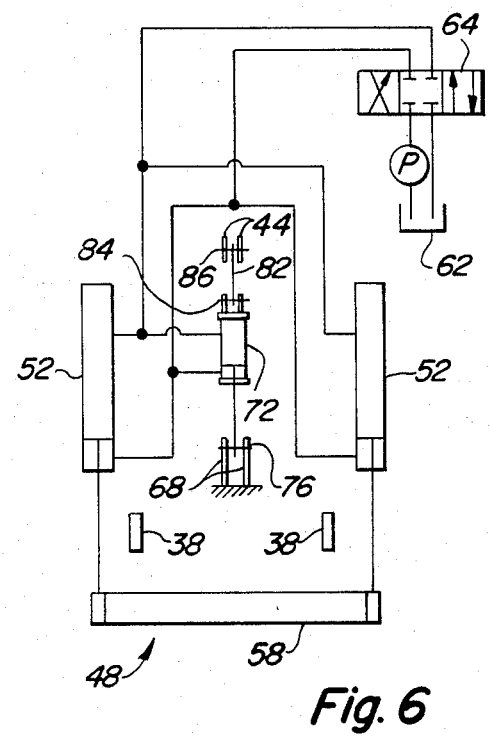

HITCH STRUCTURE WITH VARIABLE LINK

BACKGROUND OF THE INVENTION

The present invention relates generally to hitch structure for connecting an implement to a towing vehicle, and more specifically, to three-point hitch structure which permits a trailing implement to follow the ground contour.

When operating a farm machine over uneven terrain, such as terraces or ditches, there may be a problem with the machine maintaining proper relationship with the slope or contour of the soil. This is especially true, for example, when the machine includes a unit carrier towed by a tractor or other vehicle with an implement connected rearwardly of the unit carrier. If the towing implement is a tillage or planting unit, proper relationship of the unit to the soil is very important for good soil working and planting characteristics. Commonly, the trailing implement is connected to the unit carrier by a three-point hitch arrangement which generally limits the freedom of the implement to move in relation to the unit carrier. Although the problem may not be as acute when a trailing implement is mounted directly to a towing vehicle such as a tractor by a three-point hitch arrangement, the hitch does tend to limit the ability of the trailing implement to follow the ground contour and often the position of the forward portion of the implement is determined by the wheels of the towing vehicle. The trailing implement, which may be a grain drill or the like, is attached to the tractor or the unit carrier using two lower draft links and one upper rigid stabilizing link. When in the operating position, the implement is supported on a set of wheels, such as gauge wheels or press wheels, with its attitude controlled by the upper stabilizing link. As the implement passes over uneven terrain, the attitude of the implement will be changed which adversely affects the relationship of the planting unit or other implement to the soil. Although flexible upper link arrangements such as exemplified in U.S. Pat. No. 4,232,878 have been suggested, they have not been entirely satisfactory because the lost motion in the link causes the trailing implement to angle downwardly in the rearward direction when the hitch is raised to the transport position, thus limiting the rearward clearance of the implement as it is being towed. In addition, the flexibility of the implement may be limited to less than a desirable range and gauging of the forward portion of the implement is dependant on the rear tractor wheels which are usually offset a substantial distance ahead of the implement. In some hitch arrangements, the upper link consists of a hydraulic cylinder, but to provide freedom for the trailing machine to move over ground contours requires that the cylinder be free-floating during field working operations and necessitates special valving or a separate hydraulic circuit with separate controls. A hitch with such a link, therefore, is often more costly and complex and less convenient to operate than other types of three-point hitch arrangements.

OBJECTS OF THE INVENTION

It is therefore an object of the invention to provide an improved hitch structure for connecting a trailing implement to a towing vehicle such as a tractor or a unit carrier. It is a further object to provide such a structure which enhances the ability of the trailing implement to move over ground contours.

It is another object of the present invention to provide an improved three-point hitch structure which permits the trailing implement to rock freely to follow the ground contours when the hitch is in the ground-working position, but yet supports the trailing implement with good ground clearance when the hitch is in the transport position. It is another object to provide such a structure having an upper variable length link which automatically assumes a rigid configuration when the hitch is operated to lift the implement to the transport position.

It is a further object of the present invention to provide an improved three-point hitch arrangement wherein the hitch assumes a generally conventional rigid configuration when in the transport position, but automatically assumes a more flexible configuration upon lowering of the hitch to the field-working position. It is still another object to provide such a hitch arrangement in combination with stabilizing structure on the trailing implement to improve the ability of the implement to follow ground contours for better depth control and/or seed placement characteristics.

BRIEF DESCRIPTION OF THE INVENTION

In accordance with the above objects, the three-point hitch arrangement connecting the trailing implement with the towing vehicle includes an upper variable length link having a hydraulic cylinder pinned to a plate to provide three pivot points. When the cylinder is retracted, the cylinder and plate act as a fixed length link with the pivot points approximately aligned along a centerline; when the cylinder is extended, the middle pivot moves away from the centerline and permits the distance between the upper points on the trailing implement and on the towing vehicle to lengthen or shorten, as necessary, to permit the trailing implement to follow the ground contour. Gauge and/or stabilizing wheels attached directly to the trailing implement control the attitude of the implement independently of the upper connection on the three-point hitch structure. The implement thus is able to follow the ground contour to provide good depth control and/or seed placement characteristics. The hydraulic cylinder on the upper link is plumbed into a hitch lift circuit so that when the implement is raised to transport position, the variable length link automatically assumes a fixed length to eliminate lost motion and support the implement in the transport position with good ground clearance. When the drill is lowered to the operating position, the cylinder automatically extends to raise the pivot point and permit the movement of the trailing implement over the ground contour independently of the upper link.

These and other objects, features and advantages of the present invention will become apparent to those skilled in the art upon reading the following detailed description taken with the drawings.

BRIEF DESCRIPTION OF THE DRAWINGS

FIG. 4 is a side view of a trailing implement utilized with the structure of FIG. 1 and illustrating the stabilizing effect of the gauge and stabilizing wheels.

FIG. 5 is a side perspective view of the stabilizing wheel of FIG. 4.

FIG. 6 is a schematic of the hydraulic circuit utilized with the three-point hitch structure of FIGS. 1-3.

DESCRIPTION OF THE PREFERRED EMBODIMENT

Figure 1:
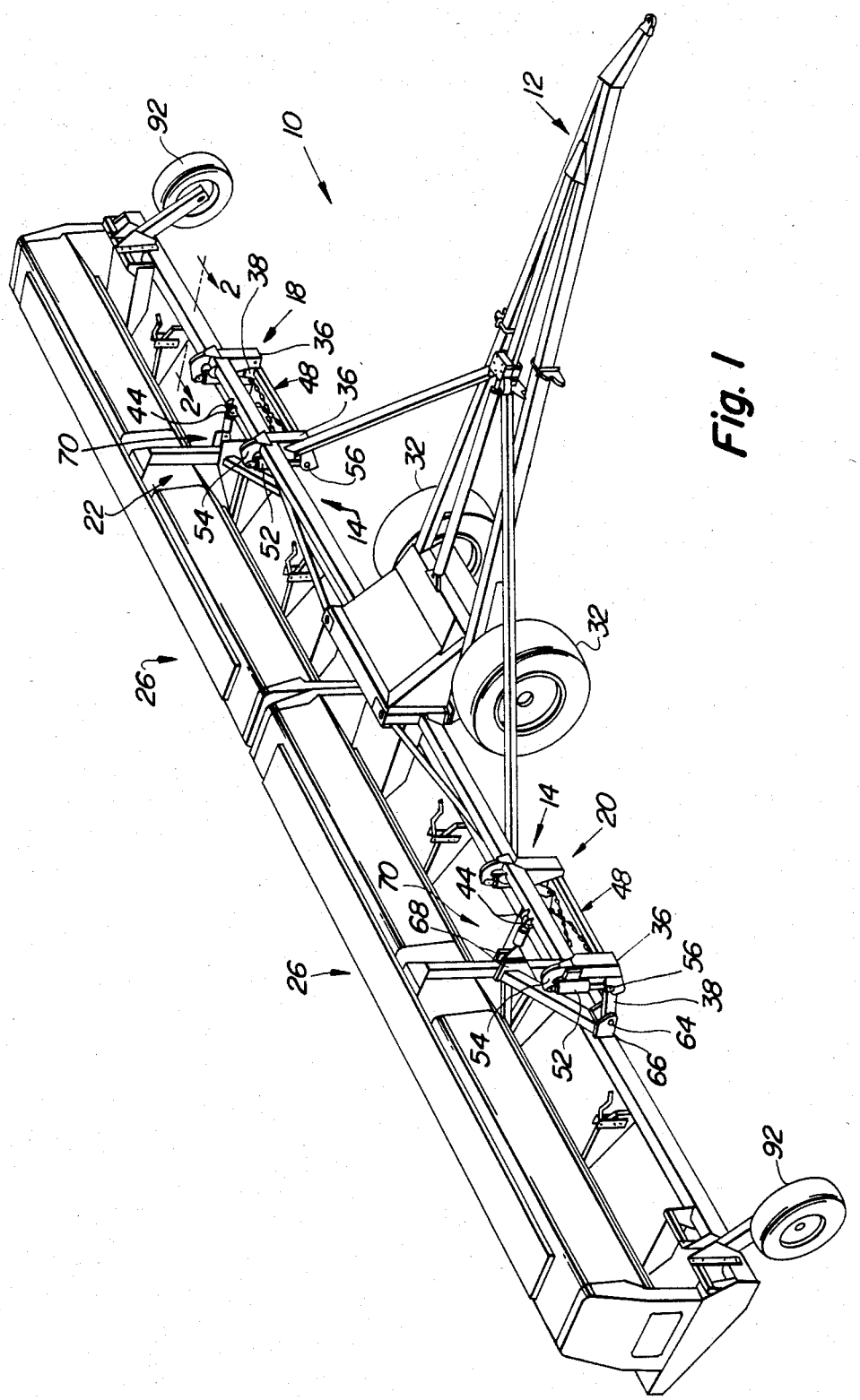
FIG. 1 is a front perspective view of a unit carrier supporting a pair of trailing implements on three-point hitch structure.

Referring now to FIG. 1, therein is shown a unit carrier indicated generally at 10 having a forwardly extending hitch 12 adapted for connection to a towing vehicle (not shown) for towing in the forward direction (F). The unit carrier 10 includes a pair of folding outriggers 14 having three-point hitch structure 18 connected to mating three-point hitch structure 22 rigidly attached to trailing implements 26. The unit carrier 10 is supported for forward movement over the ground by ground wheels 32. The unit carrier 10 shown in FIG. 1 is of the type shown and described in U.S. Pat. No. 4,518,046, issued on May 21, 1985 and assigned to the assignee of the present invention, and incorporated herein by reference. The carrier 10 therefore will only be described in sufficient detail here to orient the hitch structure of the present invention. It is to be understood that other types of vehicles, including a tractor or the like, may be utilized with the hitch structure of the present invention.

The three-point hitch structure 18 includes upright members 36 transversely spaced on the outer end of the outrigger 14. A pair of lower transversely spaced draft links or arms 38 are pivotally connected to the lower ends of the respective members 36 by pivot pin arrangements 42. A pair of transversely spaced upright plates 44 are welded or otherwise connected to the outrigger 14 and are generally located centrally between and above the members 36 to form the upper point on the three-point hitch structure 18. Hydraulically controlled lift structure 48 (FIGS. 1 and 6) is attached to the outrigger 14 to selectively engage the lower draft links 38 to raise the trailing implement 26 from a ground-working position to a transport position wherein the implement is supported by the outrigger. The lift structure 48 includes a pair of double-acting hydraulic cylinders 52 supported in upright positions from the outrigger 14 by brackets 54 connected to the outrigger and extending rearwardly therefrom. The cylinder ends of the cylinders 52 are pivotally connected to the rearwardmost ends of the brackets 54 and the rod ends of the cylinders 52 extend downwardly to pivotal connections at 56 with pivoting bar structure 58 extending transversely below the forward ends of the draft links 38 and pivotally connected at the outermost portions of the upright members 36.

Figure 3:
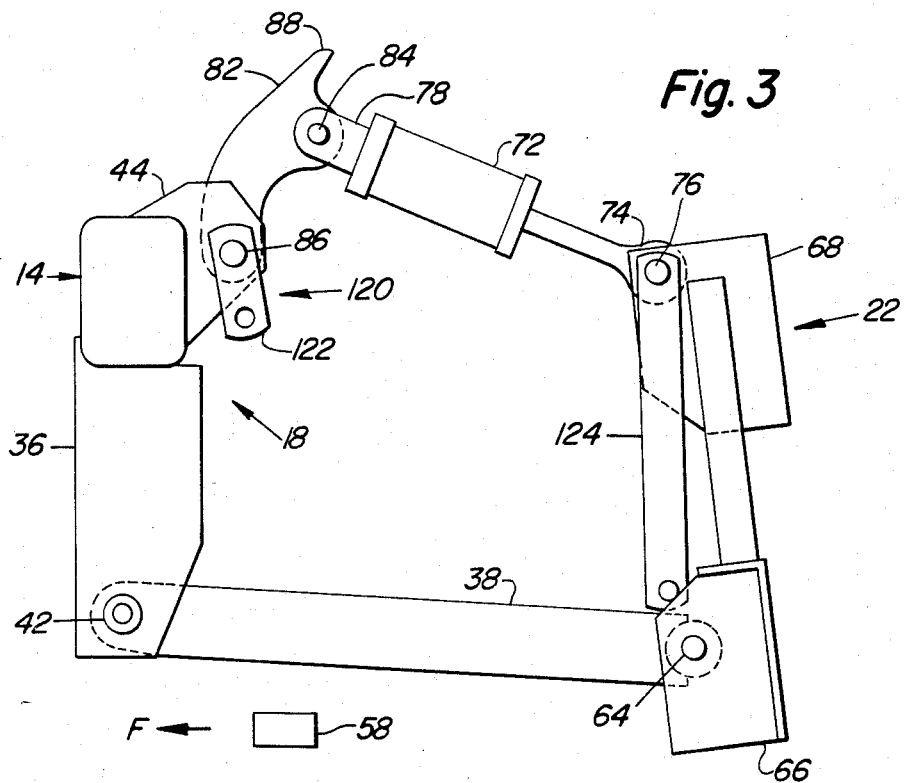
FIG. 3 is a view similar to FIG. 2 but showing the upper link extended so that the trailing implement can follow the ground contour.
Figure 2:
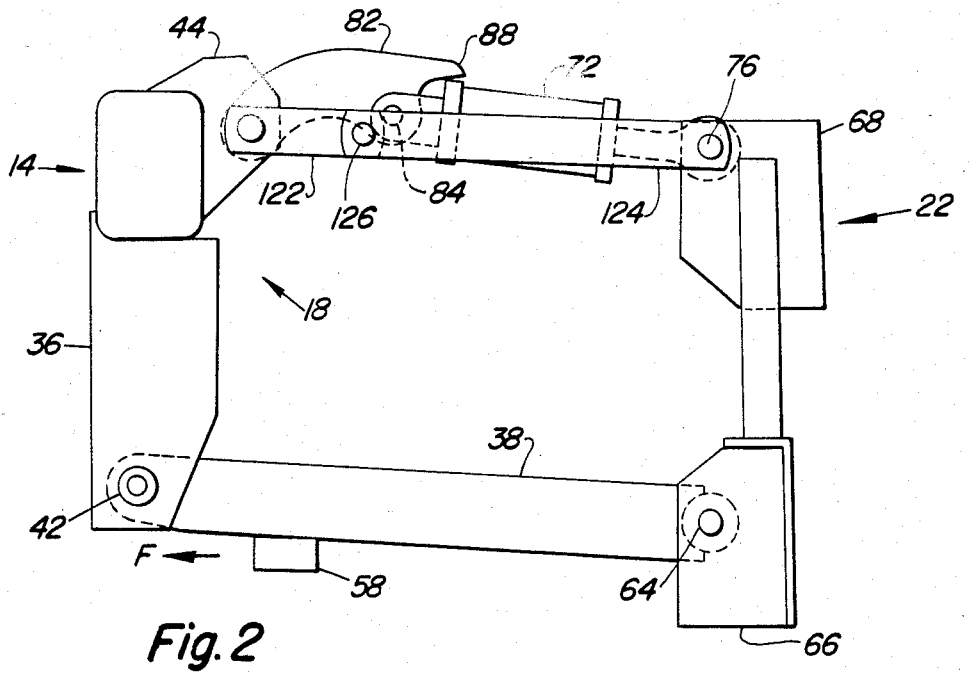
FIG. 2 is a view taken substantially along lines 2—2 of FIG. 1 and showing the upper link cylinder in the retracted position so that the upper link is rigid.

The hydraulic cylinders 52 are connected in parallel with each other (FIG. 6) and are connected to a source of hydraulic pressure 62 through a control valve 64 which is operable to extend and retract the cylinders 52 to lower and raise the lower draft links 38. The aft ends of the lower draft links 38 are connected by pivot pin arrangements 64 to the lower, transversely spaced points 66 of the three-point hitch structure 22 on the trailing implement. The hitch structure 22 includes transversely spaced plates 68 forming the upper point of the three-point connection. A variable length upper link or arm 70 is connected between the upper points 44 and 68 of the three-point hitch structures 18 and 22, respectively. The variable length link 70 includes a relatively short-stroke, double-acting hydraulic cylinder 72, having a rod end 74 pivotally connected by a pin 76 between the plates forming the upper point 68 of the hitch structure 22. The cylinder 72 includes a cylinder end in the form of a clevis 78 pivotally connected to a link or plate 82 by a pivot pin 84. The opposite end of the plate 82 is pivotally connected for rocking between the plates forming the upper point 44 of the hitch structure 18 by another pivot pin 86. In the preferred embodiment, the plate 82 assumes a C-shaped configuration opening generally downwardly and has a cylinder-contacting extension extending rearwardly above the pivotal connection at 84. Upon retraction of the cylinder 72, the extension 88 contacts the forward end of the cylinder (FIG. 2) to maintain the pivot pin 84 slightly above a centerline extending through the pivot pins 76 and 86. Upon extension of the cylinder 72 (FIG. 3), the pivot pin 84 moves upwardly away from the centerline joining the pivots 76 and 86 to permit the distance between the points 44 and 68 to lengthen or shorten as necessary so that the three-point hitch structure 22 on the trailing implement can rock freely about the pivots 64 to permit the trailing implement to independently follow the ground contour. When the cylinder 72 is retracted, the plate 82 pivots with respect to the cylinder 72 until the extension 88 contacts the end of the cylinder at which time the link 70 acts as a fixed-length link.

In the preferred embodiment, the cylinder 72 is plumbed in parallel with the cylinders 52 to extend and retract generally in unison with the cylinders 52. Therefore, when the cylinders 52 are extended, the cylinder 72 will also extend to raise the pivot point 84 to thereby render the link 70 flexible and permit the distance between the points 44 and 68 to change. When the cylinders 52 are extended to lower the draft links 38 to a field-working position, the pivoting bar structure 58 moves completely away from the bars 38 to permit free pivoting of the draft links 38 about their pivots 42 while the trailing implement is in the field-working position. Actuation of the cylinders 52 to lift the pivoting bar structure 58 into contact with the lower draft arms 38 and raise the trailing implement also causes the cylinder 72 to retract so that the link 70 assumes a generally fixed conventional configuration for stable lifting of the implement onto its corresponding outrigger without lost motion. Because the cylinders 52 and 72 are plumbed in parallel, the cylinder experiencing the least resistance will move first and, when the implement is raised from the ground, the cylinder 72 of the variable link 70 will be the first to retract, thereby assuring that the link 70 will become fixed before the trailing implement begins lifting onto the outrigger. Upon lowering the implement to the ground-working position, the cylinders 52 which are supporting the weight of the implement will extend first until the weight of the implement is removed therefrom, and thereafter the cylinder 72 will extend.

The implement 26 includes a pair of transversely spaced, forwardly extending gauge wheels 92 which are adjustable to support the implement at the proper distance above the ground while in the ground-working position. To control the attitude of the implement 26 independently of the upper link 70 of the three-point hitch structure, at least one stabilizing wheel assembly is connected to the aft end of the frame of the implement, generally between and substantially rearwardly of the transversely spaced gauge wheels 92. Since both the gauge wheels 92 and the stabilizing wheel assemblies 94 are fixed to the implement frame, the attitude of the implement 26, as best seen in FIG. 4, will be completely controlled by the wheels 92 and wheel assemblies 94 when the implement is in the ground-working position. Since the pivoting bar structure 58 is disengaged from the lower links 38 while the implement 26 is in the field-working position, the ends of the implement can rock up and down relative to each other without interference from the hitch structure.

In the embodiment shown, the implement 26 is a grain drill having furrow openers 102 with trailing press wheels 104. In this embodiment, the stabilizing wheel assembly 94 replaces one of the trailing press wheels 104. However, rather than being yieldably biased downwardly against the ground as the conventional press wheels 104, the wheel assembly 94 is fixed to the implement frame to provide the necessary stability toward the rear of the implement. A bracket 108 is bolted or otherwise fixed to rear platform 109 of the grain drill 26. The bracket 108 supports the bight portion of a yoke 110, and a rubber-tired wheel 112 is mounted for rotation about an axle 114 at the lower ends of the side legs of the yoke 110. A brace 116 is fixed to the bight portion of the yoke 110 and to the frame of the implement 26 by a bracket 118 to prevent the yoke 110 from pivoting and fix the wheel 112 with respect to the implement frame.

In operation, the outriggers 14 are folded outwardly (FIG. 1) and the valve 64 (FIG. 6) is operated to extend the cylinders 52 and lower the implements 26 to their ground-working positions. The cylinders 72 also extend to raise each pivot 84 above the line connecting the corresponding pivots 76 and 86 (FIG. 3) so that the implements 26 are free to follow the ground contour as the gauge wheels 92 and the stabilizing wheels 112 ride on the surface of the ground. To move the implements 26 to the transport position, the valve 64 is operated to retract the cylinders 52 and 72. Each cylinder 72 retracts until the extension 88 of the plate 82 contacts the cylinder 72 and the link 70 again acts as a rigid link. The bar structure 58 engages and lifts the lower links 38 to raise the implements 26 from the ground onto the unit carrier 10. A transport locking arrangement indicated generally at 120 is provided and includes a forward strap 122 connected at one end to the pivot pin 86 and a rearward strap 124 connected at its upper end to the pivot pin 76. When the cylinder 72 is fully retracted so that the extension 88 stops against the cylinder 72, the lower ends of the straps 122 and 124 are connected by a bolt 126 to secure the upper link in the rigid position (FIG. 2) and prevent the hitch structure 22 from rotating in a clockwise direction about the pivot 64 under the weight of the implement 26 should there be a loss of fluid pressure in the cylinder 72 during transport.

Having described the preferred embodiment, it will be apparent that modifications can be made without departing from the scope of the invention as defined in the accompanying claims.

We claim:

1. A three-point hitch for attaching an implement to a towing vehicle, comprising laterally spaced lower draft arms connected between the vehicle and the implement, an upper arm located between and above the lower draft arms pivotally connected to the implement and to the vehicle comprising a link, an extendable and retractable arm cylinder, and pivot means pivotally connecting the arm cylinder to the link, and means for selectively rendering the upper arm rigid or nonrigid to thereby selectively restrict or permit rocking of the connected implement relative to the vehicle including means for operating the cylinder to move the pivot means generally in line with the link and cylinder and thereby limit pivoting of the cylinder about the pivot means.

2. The invention as set forth in claim 1 wherein the upper arm is pivotally connected to the implement and to the vehicle and wherein the pivot means when the cylinder is retracted is located adjacent but slightly above a line connecting the pivotal connections of the upper arm with the implement and vehicle so that upon extension of the cylinder, the pivot means moves upwardly with respect to the line.

3. The invention as set forth in claim 1 further comprising means for moving the lower arms vertically including a hydraulic cylinder connected between the towing vehicle and the lower arms, and wherein the arm cylinder comprises a hydraulic cylinder, and means connecting the arm cylinder in fluid communication with the lift cylinder for operating the arm cylinder in unison with the lift cylinder.

4. The invention as set forth in claim 3 wherein the lift and arm cylinders are plumbed in parallel.

5. The invention as set forth in claim 3 including means for operating the lift cylinder to raise and lower the implement, and means responsive to the means operating the lift cylinder for extending the arm cylinder as the implement is lowered to thereby move the pivot means to permit the implement to freely rock with respect to the vehicle.

6. The invention as set forth in claim 5 further comprising means responsive to the raising of the implement to retract the hydraulic cylinder.

7. The invention as set forth in claim 1 wherein the implement includes stabilizing means for permitting the implement to follow the contour of the ground independently of the upper arm when the arm cylinder is extended.

8. The invention as set forth in claim 1 wherein the link includes a cylinder-contacting extension, said extension contacting the arm cylinder upon retraction of the arm cylinder to prevent the pivot means from rocking beyond a preselected point.

9. A three-point hitch for attaching an implement to a towing vehicle, comprising: laterally spaced lower draft arms pivotally connected between the vehicle and implement; an upper arm comprising a link and an extendable and retractable hydraulic cylinder pivotally connected to the link; means connecting the upper arm to the vehicle and implement for rocking about first and second pivots; and means operating the cylinder to move the pivotal connection of the cylinder with the link with respect to a line joining the first and second pivots from a generally rigid transport position wherein said pivotal connection of said cylinder and link lies between the first and second pivots closely adjacent the line and a flexible fieldworking position wherein said pivotal connection is offset a substantial distance from the line.

10. The invention as set forth in claim 9 including stop means for preventing the pivotal connection of the cylinder with the link from aligning with the first and second pivots.

11. The invention as set forth in claim 10 wherein the stop means comprises an extension of the link located above the pivotal connection of the link with the cylinder and movable into contact with the cylinder upon retraction of the cylinder.

12. The invention as set forth in claim 9 including lift means for moving the lower draft arms vertically between upper and lower positions, and wherein the means operating the cylinder includes means responsive to the lift means for automatically moving the pivotal connection to the rigid transport position upon movement of the draft arms to the upper position.

13. The invention as set forth in claim 12 wherein the lift means comprises a hydraulically operated member selectively engageable with the lower draft arms and means connecting the hydraulically operated member and the arm cylinder for operation generally in unison.

14. The invention as set forth in claim 13 wherein the lift means includes a second hydraulic cylinder and the means connecting the member and the arm cylinder includes a parallel connecting circuit for extending and retracting the cylinders generally in unison.

15. The invention as set forth in claim 12 wherein the lift means comprises a second hydraulic cylinder and the means responsive to the lift means includes means for automatically moving the pivotal connection of the cylinder and link to the flexible field-working position upon movement of the draft arms to the lower position.

16. The invention as set forth in claim 15 including means connecting the hydraulic cylinders for operation in parallel.

17. A three-point hitch for attaching an implement to a towing vehicle, comprising: laterally spaced lower draft arms pivotally connected between the vehicle and implement; an upper arm comprising a link and an extendable and retractable hydraulic cylinder pivotally connected to the link; means connecting the upper arm to the vehicle and implement for rocking about first and second pivots; means operating the cylinder to move the pivotal connection of the cylinder with the link with respect to a line joining the first and second pivots from a generally rigid transport position wherein said pivotal connection of said cylinder and link lies between the first and second pivots closely adjacent the line and a flexible field-working position wherein said pivotal connection is offset a substantial distance from the line, and including stop means for preventing the pivotal connection of the cylinder with the link from aligning with the first and second pivots, said stop means comprising an extension of the link located radially outwardly of the pivotal connection of the link with the cylinder and movable into contact with the cylinder upon retraction of the cylinder.

18. The invention as set forth in claim 17 including lift means for moving the lower draft arms vertically between upper and lower positions, and wherein the means operating the cylinder includes means responsive to the lift means for automatically moving the pivotal connection to the generally rigid transport position upon movement of the draft arms to the upper position.

19. The invention as set forth in claim 18 wherein the lift means comprises a second hydraulic cylinder connected in parallel with the first-mentioned hydraulic cylinder.

* * * * *